United States Patent [19]

Okumoto et al.

[11] Patent Number: 4,916,272
[45] Date of Patent: Apr. 10, 1990

[54] PERFORATING APPARATUS FOR WEB

[75] Inventors: Yutaka Okumoto; Takao Furukawa, both of Tokyo, Japan

[73] Assignee: Japan Tobacco Inc., Tokyo, Japan

[21] Appl. No.: 383,444

[22] Filed: Jul. 24, 1989

[30] Foreign Application Priority Data

Jul. 28, 1988 [JP] Japan .................................. 63-186950

[51] Int. Cl.⁴ ............................................. B23K 26/00
[52] U.S. Cl. .................................. 219/121.7; 131/281
[58] Field of Search ............. 219/121.7, 121.71, 121.6, 219/121.85; 131/281

[56] References Cited

U.S. PATENT DOCUMENTS 4,302,654 11/1981 Bennett et al. ................ 219/121.7 X
4,507,535 3/1985 Bennett et al. ................. 219/121.71
4,767,909 8/1988 Okumoto ............................ 219/121.7

Primary Examiner—C. L. Albritton
Attorney, Agent, or Firm—Nixon & Vanderhye

[57] ABSTRACT

A perforating apparatus comprises a pair of guide drums for guiding a web so that the web is wound so as to cover part of the mark members of the guide drums, respectively, each guide drum having a ring-shaped mask member, and a plurality of slits formed in the mask member, the mask members of the guide drums being situated in different axial positions with respect to the axial direction of the guide drums. The apparatus further comprises a laser beam generator, a two-segment mirror adapted to reflect the laser beam, emitted form the laser beam generator, in two split laser beams, two direction changing mirror for guiding the split laser beam into the guide drums so as to be coaxial therewith, multisegment reflection mirrors and adapted to reflect the split laser beam toward the web on the guide drums, and condensing lenses arranged between the mask members and the multisegment reflection mirrors and adapted to converge the subdivided laser beams, reflected by the multisegment reflection mirrors, on the web on the guide drums through the slits, the positions of the condensing lenses being deviated from one another in the axial direction of the guide drums.

9 Claims, 5 Drawing Sheets

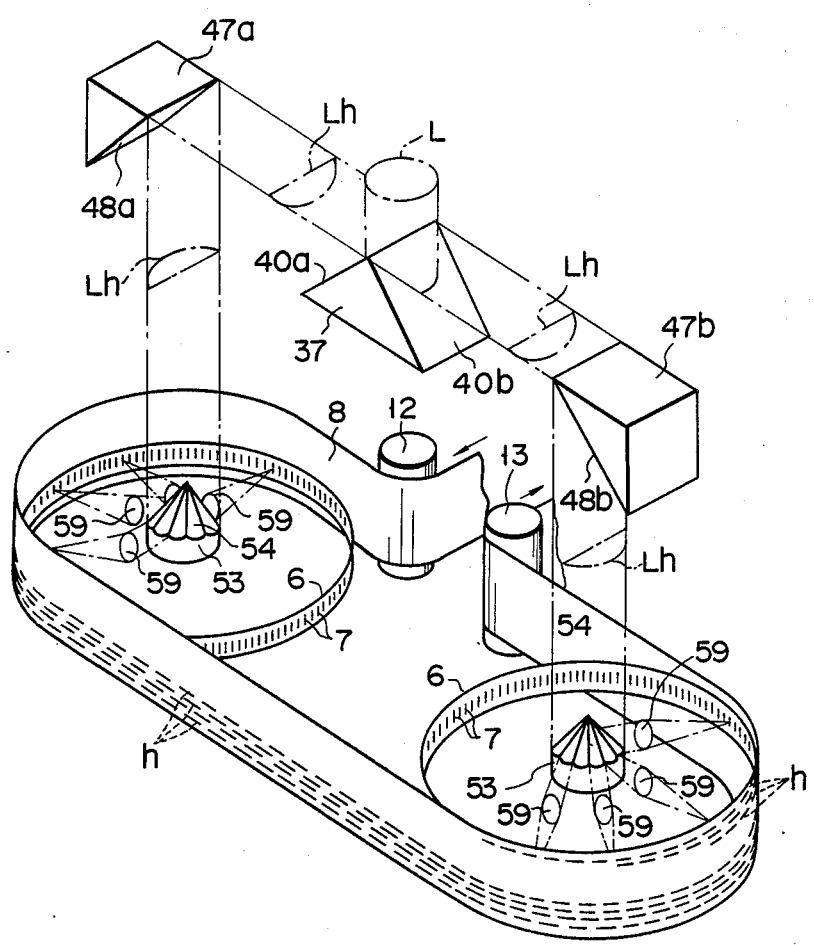
F I G. 2

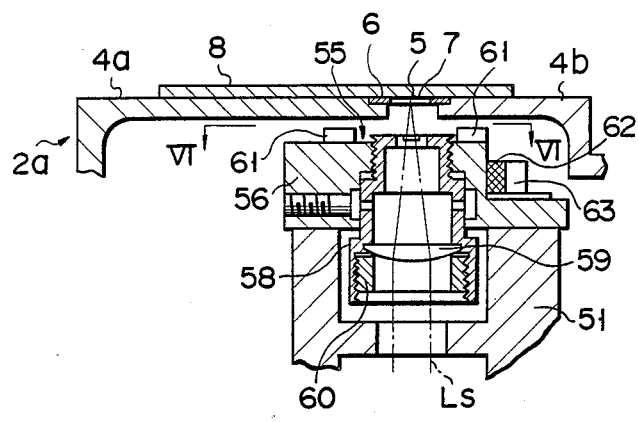
F I G. 3
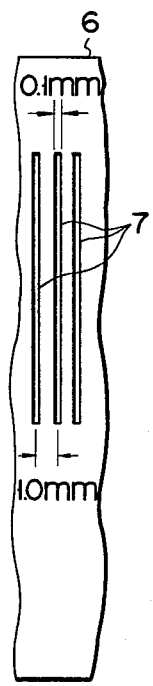
F I G. 4

PERFORATING APPARATUS FOR WEB

BACKGROUND OF THE INVENTION

1. Field of the Invention

The present invention relates to a perforating apparatus for forming a pair of row groups of perforations in a web to be reduced to tip papers used in the manufacture of filter cigarettes, for example.

2. Description of the Related Art

Recently, many smokers have started to love filter cigarettes of relatively light taste. Commercially available, therefore, are filter cigarettes in which a number of perforations are formed in the tip paper. If the perforations are bored through the tip paper, cigarette smoke can be thinned by air which flows into the mouth through the perforations and the filter, so that tar and nicotine in tee smoke can be satisfactorily adsorbed by the filter.

The perforations can be formed in the tip paper by two methods. In one method, a number of perforations are bored through the tip paper of a filter cigarette after the cigarette is finished. In the other method, a great number of perforations are previously bored through a web to be reduced to tip papers, before a cigarette and its filter are connected by means of the tip paper.

Perforating apparatuses for effecting the aforesaid second method are disclosed in U.S. Pat. Nos. 4,302,654 and 4,507,535, for example. Both these apparatuses are provided with a hollow cylindrical mask member which is supported for rotation. A number of openings are formed circumferentially at regular intervals in the peripheral surface of the mask member.

A web is transported in a manner such that it is wound on part of the peripheral surface of the mask member, while causing the mask member to rotate. Laser beams are applied to the web through the openings of the mask member, in the course of the transportation of the web, so that a row or rows of perforations are formed in the web.

The aforementioned conventional perforating apparatuses are suited for the formation of one or two rows of perforations. For the formation of three or more rows of perforations, however, the internal construction in the mask member must be complicated. More specifically, in the conventional perforating apparatuses, the mask member must contain beam guides as many as the rows of perforations to be bored through the web. Thus, these apparatuses are unfit for the formation of a relatively large number of rows of perforations.

In the conventional perforating apparatuses, moreover, rows of openings as many as the rows of perforations to be bored through the web must be formed in the mask member. If the rows of openings are thus independent from one another, it is difficult to make uniform the shape and array of the perforations formed by means of the laser beams applied through the individual rows of openings of the mask member. Accordingly, the external appearance of finished products may possibly be spoiled.

SUMMARY OF THE INVENTION

The present invention has been contrived in consideration of these circumstances, and its object is to provide a perforating apparatus of a simple construction, which can form regular rows of perforations of a uniform shape in a web, thereby improving the external appearance of the web.

A perforating apparatus according to the present invention comprises a pair of rotatable guide drums. A web is transported in a manner such that it is partially wound in succession on the respective outer peripheral surfaces of the guide drums, while causing the drums to rotate. A circumferential opening, which is formed in the outer peripheral surface of each guide drum, is closed by means of a mask member. The outer peripheral surface of the mask member is flush with that of the guide drum, and a plurality of slits are formed in the mask member so as to extend in the direction of the with of the mask member and be arranged circumferentially at intervals.

The perforating apparatus further comprises laser beam converging means for converging laser beams through the slits of the mask members on the web wound on the respective outer peripheral surfaces of the guide drums, thereby forming very small holes in the web.

The laser beam converging means includes a laser beam generator for emitting a continuous laser beam, a two-segment mirror for bisecting the laser beam from the laser beam generator, multisegment reflection mirrors for radially reflecting split laser beams from the two-segment mirror toward the outside of the guide drums, a plurality of condensing lenses arranged in the guide drums and adapted to converge subdivided laser beams from the multisegment reflection mirrors on the web through the slits of the mask members. The multisegment mirror and the condensing lenses of the one guide drum and those of the other guide drum are situated so that the subdivided laser beams are converged on regions of the web on opposite sides with respect to the center line thereof. In each guide drum, the positions of the individual converging lenses are deviated from one another in the axial direction of the drum.

According to the perforating apparatus described above, when the web is transported past the one guide drum, while causing the guide drums, the subdivided laser beams, radially reflected by the multisegment mirrors, are converged on the web through their corresponding condensing lenses and the slits of the mask member. Thus, a plurality of rows of perforations are formed in the one side region of the web with respect to the center line thereof. As the web is passes the other guide drum, thereafter, a plurality of rows of perforations are also formed in the other side region of the web.

According to the perforating apparatus of the present invention, one laser beam is divided into split laser beams by means of the two-segment mirror, the split laser beams are further divided by means of the multisegment mirrors disposed individually in the guide drums, and the subdivided laser beams are guided onto the web. Accordingly, the construction of the optical system for guiding the laser beams is simple. Also, in forming two or more rows of perforations in each guide drum, in particular, it is necessary only that the condensing lenses and the reflecting surfaces of each multisegment mirror be increased in number. Thus, the internal construction in the guide drums need not be specially complicated.

The slits of the mask members extend in the transverse direction of the web, and each laser beam converged on the web by means of each condensing lens in each guide drum passes one and the same slit to form the perforations of the individual rows in the web. Even if the number of rows of the perforations is relatively large, therefore, the shape and size of the individual perforations, as well as the arrangement of the rows, can be made uniform, so that the external appearance of finished products can be improved.

BRIEF DESCRIPTION OF THE DRAWINGS

FIG. 2 is a schematic perspective view showing part of the perforating apparatus of FIG. 1;

FIG. 3 is an enlarged sectional view showing part of the apparatus of FIG. 1;

FIG. 4 is an enlarged side view showing part of a ring-shaped mask used in the apparatus of FIG. 1;

DETAILED DESCRIPTION OF THE PREFERRED EMBODIMENTS

Figure 1:
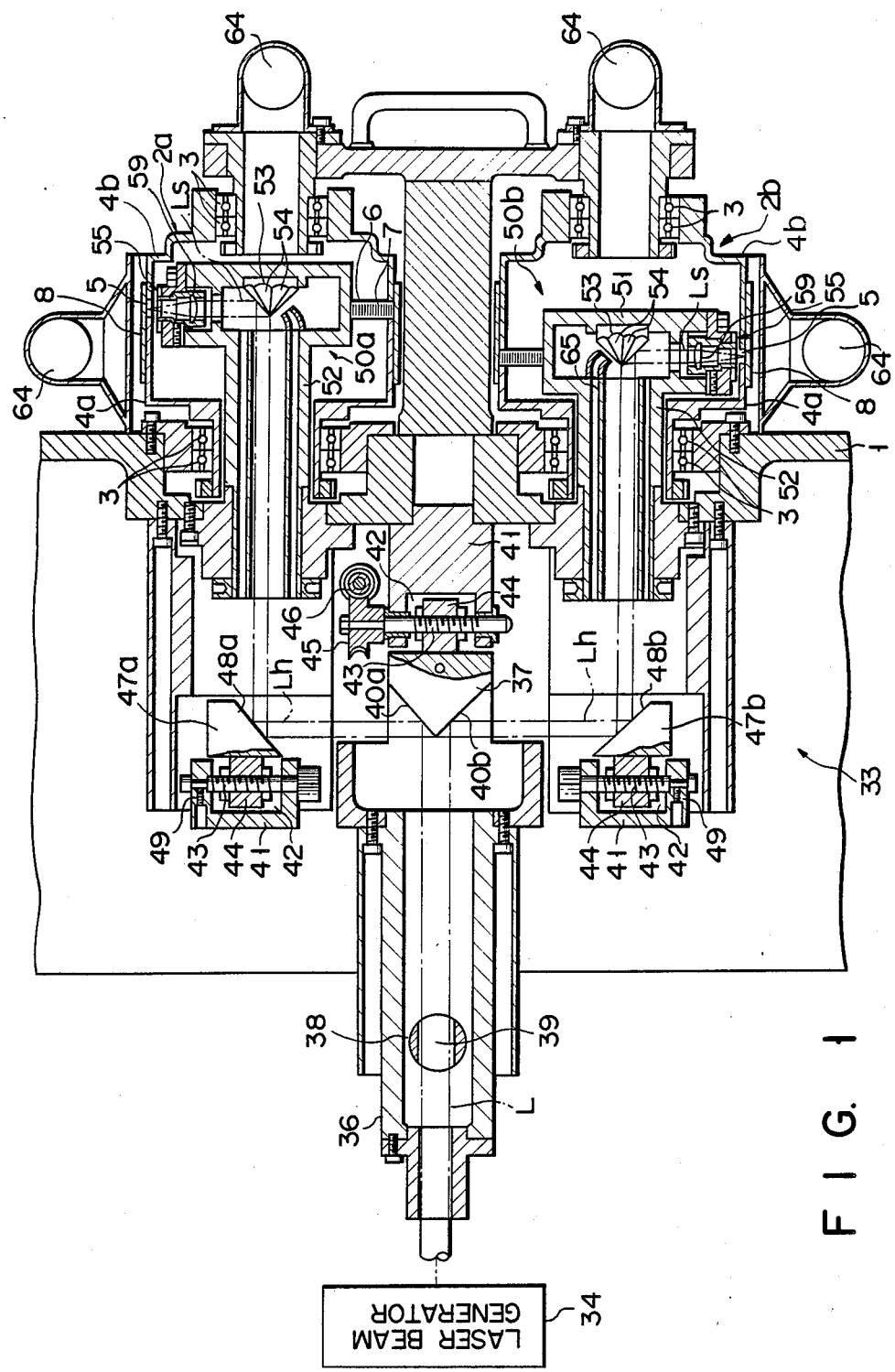
FIG. 1 is a partial sectional view of a perforating apparatus according to an embodiment of the present invention.

A perforating apparatus shown in FIG. 1 has frame 1, on which are rotatably mounted a pair of guide drums 2a and 2b, each in the form of a hollow cylinder, by means of bearings 3. As seen from FIG. 1, drums 2a and 2b are juxtaposed to each other. These drums are not shown in FIG. 2.

Guide drum 2a is formed of drum halves 4a and 4b. Circumferential opening 5 is defined between halves 4a and 4b. FIG. 3 shows opening 5 in detail.

Circumferential opening 5 of guide drum 2a is closed by means of ring-shaped mask 6. Mask 6, which is made of nickel, has a thickness of 0.1 mm, and a number of slits 7 are arranged on the peripheral surface of the mask, at regular intervals in the circumferential direction thereof. As shown in FIG. 4, slits 7 extend in the direction of the width of mask 6. In this embodiment, the pitch of slits 7 is 1.0 mm, and the width of each slit is 0.1 mm.

As seen from FIG. 3, moreover, the respective outer peripheral surfaces of guide drum 2a and mask 6 are situated within the same cylindrical plane.

Guide drum 2b has substantially the same construction as guide drum 2a described above. Therefore, like reference numerals are used to designate those members or portions of drum 2b having the same functions as their counterparts of drum 2a. The following is a description of only the difference between the two drums. The axial position of circumferential opening 5 or mask 6 of guide drum 2b is different from that of mask 6 of guide drum 2a. More specifically, mask 6 of drum 2a is situated on the right end side of drum 2a, as shown in FIG. 1, while mask 6 of drum 2b is situated on the left end side of drum 2b.

As seen from FIG. 2, web 8 is continuously passed around the respective outer peripheral surfaces of guide drums 2a and 2b. In this embodiment, web 8 is a paper web which is reduced to tip papers for filter cigarettes.

After web 8 passes through guide drum 2a, it is transported past guide drum 2b. As web 8 is transported in this manner, drums 2a and 2b are rotated draggingly by the web.

Figure 5:
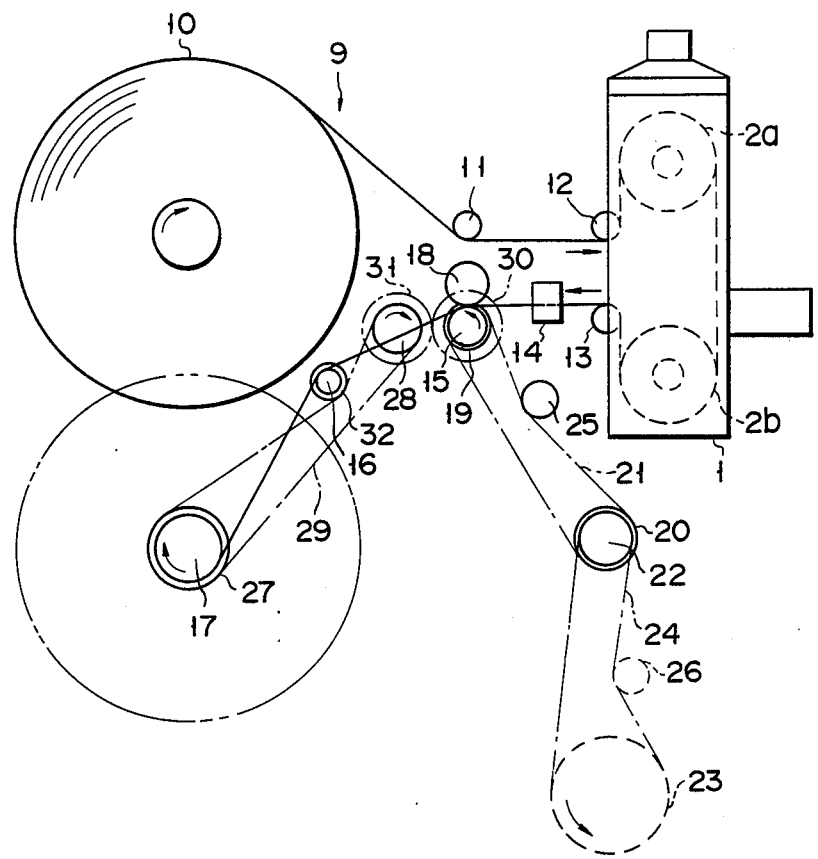
FIG. 5 is a schematic view of means for transporting a web to the apparatus of FIG. 1.

FIG. 5 shows transportation means 9 for web 8. Means 9 includes web roll 10 located beside guide drums 2a and 2b. Web 8 let out from roll 10 is guided to drum 2a by guide rollers 11 and 12, and is then delivered to drum 2b. Thereafter, the web is transported past guide roller 13, guide block 14, drive roller 15, and guide roller 16, to be taken up by takeup roll 17.

Drive roller 15, which is in rolling contact with pinch roller 18, is fitted coaxially with toothed pulley 19. Toothed belt 21 is passed around and between pulley 19 and its mating toothed pulley 20.

Another toothed pulley 22 is mounted on toothed pulley 20 so as to be coaxial therewith. Toothed belt 24 is passed around and between pulley 22 and its mating toothed pulley 23. Pulley 23, which is mounted on the output shaft of an electric motor (not shown), can be rotated in the direction of the arrow of FIG. 5. Numerals 25 and 26 designate tension rollers, individually.

Toothed pulley 27 is mounted on takeup roll 17 so as to be coaxial therewith, and toothed pulley 28 mating with toothed pulley 27 is mounted beside drive roller 19. Toothed belt 29 is passed around and between pulleys 27 and 28. Gears 30 and 31 in mesh with each other are mounted on pulley 28 and roller 19, respectively, so as to be coaxial therewith Numeral 32 designates a tension pulley which is mounted on guide roller 16 so as to be coaxial therewith.

According to transportation means 9 constructed in this manner, when the electric motor is driven so that toothed pulley 23 is rotated in the direction of the arrow, drive roller 19 is also rotated in the direction of the arrow by means of toothed belts 42 and 21. Accordingly, web 8 is continuously let out from web roll 10, and travels past guide drums 2a and 2b, as mentioned before. As drive roller 19 rotates in the aforesaid manner, moreover, takeup roll 17 is also rotated in the direction of the arrow by means of gears 30 and 31 and toothed belt 29. Thus, web 8 transported past roller 19 is taken up by roll 17 the moment it is let out from roll 10.

FIG. 2 shows only guide rollers 12 and 13 of transportation means 9.

Referring again to FIGS. 1 and 2, there will be described beam-perforation means 33 for forming a pair of row groups of perforations in web 8 passing through guide drums 2a and 2b.

Beam-perforation means 33 comprises laser beam generator 34 located outside frame 1 as shown in a block in FIG. 1. Generator 34 has a function to emit continuous circular laser beam L toward guide drums 2a and 2b. Laser beam L emitted from generator 34 extends through tubular beam guide 36, and reaches two-segment mirror 37. Guide 36 and mirror 37 are arranged on a central axis between drums 2a and 2b. Intermission ball 38 for intermitting the passage of beam L is rotatably disposed in beam guide 36. Through hole 39 is bored through ball 38. Only when hole 39 of ball 38 is coaxial with guide 36, as shown in FIG. 1, laser beam L from laser beam generator 34 can pass through hole 39 to reach two-segment mirror 37. If intermission ball 38 is rotated through 90° from the position shown in FIG. 1, beam L directed to mirror 37 is intercepted.

Two-segment mirror 37, which is in the form of a triangular prism having one edge directed to laser beam generator 34, has a pair of reflecting surfaces 40a and 40b divided by the edge and extending at right angles to each other. The edge of mirror 37 extends at right angles to the axis of laser beam L, so that beam L landed on mirror 37 is divided into two sections, in the direction perpendicular to its axis, as it is reflected by surfaces 40a and 40b.

Two-segment mirror 37 is mounted on frame 1 by means of holder block 41. More specifically, mirror 37 is mounted on block 41 so that its position can be adjusted in the direction perpendicular to the axis of laser beam L emitted from laser beam generator 34. Recess 42 is formed in the mirror-side end face of holder block 41, and feed screw 43 is rotatably attached to block 41 so as to penetrate recess 42. In recess 42, screw 43 is threadedly engaged with nut member 44, which is fixed to two-segment mirror 37 and is prevented from rotating. Worm wheel 45 is mounted on one end of screw 43, and worm 46 is in mesh with wheel 45. When worm 46 is rotated by drive means (not shown), therefore, this rotation is transmitted through worm wheel 45 to feed screw 43, so that screw 43 is also rotated. Thus, the position of two-segment mirror 37 can be adjusted in the direction perpendicular to the axis of laser beam L by means of nut member 44.

Since the position of two-segment mirror 37 is adjustable in this manner, the aforesaid side of mirror 37 can be accurately aligned with the axis of laser beam L. Accordingly, split laser beams Lh reflected individually by reflecting surfaces 40a and 40b of mirror 37 have a precise semicircular shape, as shown in FIG. 2.

Two split laser beams Lh obtained by bisecting laser beam L by means of two-segment mirror 37 reach direction changing mirrors 47a and 47b, individually, whereupon they are reflected by reflecting surfaces 48a and 48b of mirrors 47a and 47b. Surfaces 48a and 48b of mirrors 47a and 47b face reflecting surfaces 40a and 40b, respectively, of two-segment mirror 37 in parallel relation. Thus, split laser beams Lh reflected by mirrors 47a and 47b face their corresponding guide drums 2a and 2b, in parallel with original laser beam L.

Direction changing mirrors 47a and 47b are mounted so that their positions can be adjusted by means of mechanisms similar to the adjusting mechanism for two-segment mirror 37. Therefore, like reference numerals are used to designate those members having the same functions as their counterparts of the position adjusting mechanism for mirror 37. In the position adjusting mechanisms for direction changing mirrors 47a and 47b, feed screw 43 is adapted to be manually rotated, and holder block 41 is provided with setscrew 49 for preventing screw 43 from rotating after the position adjustment for each direction changing mirror.

Split laser beams Lh, whose direction is changed by direction changing mirrors 47a and 47b, are guided into beam distributors 50a and 50b, respectively. The following is a representative description of beam distributor 50a associated with mirror 47a.

Beam distributor 50a includes cylindrical mirror housing 51 disposed in guide drum 2a. Tubular beam guide 52 extends from housing 51. It projects toward direction changing mirror 47a, outside guide drum 2a. The projecting end of guide 52, opened to reflecting surface 48a of mirror 47a, is fixedly retained by means of frame 1.

Multisegment mirror 53 is attached to the inner wall surface of mirror housing 51 which faces reflecting surface 48a of direction changing mirror 47a. In this embodiment, mirror 53 is in the form of a regular octagonal pyramid, and has eight reflecting surfaces 54 in total. Each surface 54 is inclined at an angle of 45° to split laser beam Lh redirected by mirror 47a.

Split laser beam Lh, redirected by direction changing mirror 47a, passes through beam guide 52 to enter mirror housing 51, whereupon it is applied to only half of reflecting surfaces 54 of multisegment mirror 53, that is, four surfaces 54 which face in the direction opposite to the other guide drum 2b. It is to be understood that such positioning of split laser beam Lh is effected by means of the aforementioned position adjusting mechanism.

Accordingly, subdivided laser beams Ls, which are obtained by further fractionizing split laser beam Lh by means of four reflecting surfaces 54 of multisegment mirror 53, extend radially outward with respect to guide drum 2a, that is, toward web 8 on drum 2a.

Figure 6:
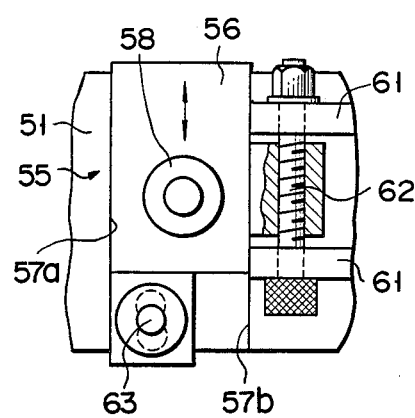
FIG. 6 is a plan view taken along line VI—VI of FIG. 3.

Converging units 55, as many as and corresponding to subdivided laser beams Ls, are arranged circumferentially at intervals on the peripheral surface of mirror housing 51. FIGS. 3 and 6 show one of units 55 in detail.

Each converging unit 55 includes movable block 56 which is attached to the peripheral surface of mirror housing 51 so as to be movable in the axial direction of guide drum 2a, that is, in the transverse direction of web 8. In FIG. 6, numerals 57a and 57b designate guide surfaces which are formed on the peripheral surface of housing 51 to guide movable block 56.

Lens holder 58 is attached to movable block 56. It is in the form of a hollow stepped cylinder open at both ends. Holder 58 is fixed to block 56 so that its small-diameter end is movably screwed in block 56. Condensing lens 59 is housed in lens holder 58. It is fixedly retained by means of retaining ring 60 which is screwed in the large-diameter end portion of holder 58. Lens 59 has a function to converge subdivided laser beam Ls on web 8 through slits 7 of mask 6 on guide drum 2a. Thus, the focus of lens 59 is on web 8 wound on guide drum 2a.

As described above, condensing lenses 59 of converging units 55 converge subdivided laser beams Ls on web 8. The focal positions of lenses 59, however, are deviated from one another in the transverse direction of web 8. This deviation can be obtained by shifting movable blocks 56. In this embodiment, the positions of blocks 56 of converging units 55 can be adjusted by means of a mechanism similar to the aforementioned adjusting mechanisms for two-segment mirror 37 and direction changing mirrors 47a and 47b. As shown in FIG. 6, a pair of brackets 61 are formed on mirror housing 51. Feed screw 62, which is rotatably supported between brackets 61, is threadedly engaged with nut member 56a which is fixed to movable block 56. Numeral 63 designates a setscrew for fixing block 56 to housing 51.

Beam distributor 50a described above is associated with guide drum 2a. The other beam distributor 50b, which is associated with guide drum 2b, basically has the same construction as distributor 50a. Therefore, like reference numerals are used to designate those members of distributor 50b having the same functions as their counterparts of distributor 50a.

Beam distributor 50b differs from beam distributor 50a in that mirror housing 51 is shifted with respect to the axial direction of guide drum 2b. This is because the position of mask 6 on drum 2b is deviated from that of mask 6 on guide drum 2a in the axial direction, as mentioned before.

In FIG. 1, numeral 64 designates exhaust ducts through which smoke emitted from web 8 by perforation work using the laser beam is discharged. Numeral 65 designates passages for cooling air for cooling multisegment mirror 53. Passages 65 are connected to a cooling air source (not shown).

According to the perforating apparatus described above, guide drum 2a or mask 6 rotates as web 8 passes guide drum 2a. In this state, if subdivided laser beams Ls transmitted through converging units 55 or condensing lenses 59 of beam distributor 50a are converged on web 8 through slits 7 of mask 6, perforations h are successively formed in web 8 at intervals in the longitudinal direction thereof. In this arrangement, the position of mask 6 on guide drum 2a is one-sided, and also, the focal positions of condensing lenses 59 of beam distributor 50a are deviated from one another in the transverse direction of web 8. Thus, as shown in FIG. 2, four rows of perforations are bored through one side region of web 8 transported past guide drum 2a.

Figure 7:
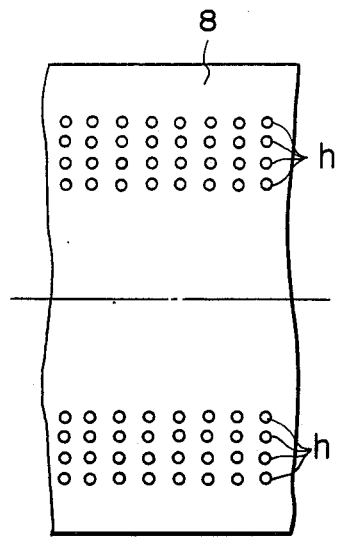
FIG. 7 is a front view showing part of the web with perforation.

Thereafter, when web 8 passes guide drum 2b, four rows of perforations are also bored through the web by means of beam distributor 50b of drum 2b. Mask 6 of distributor 50b or guide drum 2b is situated on that side end portion of drum 2b opposite to the side of mask 6 of guide drum 2a. Thus, as shown in FIG. 2, the latter four rows of perforations are bored through the other side region of web 8 transported past guide drum 2b. Finally, therefore, a pair of four-row lines of perforations are separately formed in ribbonlike web 8 transported past paired guide drums 2a and 2b, as shown in FIG. 7.

Figure 8:
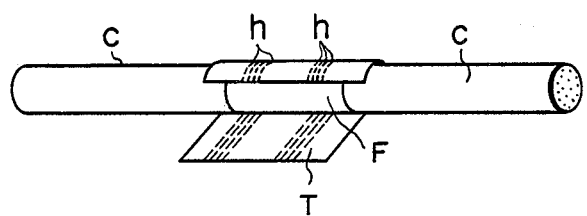
FIG. 8 is a perspective view showing filter cigarettes connected by means of a perforated tip paper.

Web 8, perforated in this manner, is cut into tip papers T of a predetermined length. Each tip paper T, as shown in FIG. 8, is wound around two cigarettes C and filter F for two cigarettes to connect them with one another. Thereafter, the resulting half-finished good for two filter cigarettes is cut in two in the middle. Thus, two independent filter cigarettes can be obtained as finished products.

It is to be understood that the present invention is not limited to the embodiment described above, and that various changes and modifications may be effected therein by one skilled in the art without departing from the scope or spirit of the invention. Naturally, the web to be perforated is not limited to the paper web adapted to be reduced to tip papers for filter cigarettes, and the perforating apparatus of the invention may be also used to perforate webs of various other types.

What is claimed is:

1. A perforating apparatus for forming a plurality of rows of very small holes in a web, comprising:
   a pair of hollow guide drums having their respective axes parallel to each other and arranged so as to be freely rotatable around the axes, each said guide drum having a circumferential opening defined in the outer peripheral wall thereof, a ring-shaped mask member whose outer peripheral surface is situated within the same cylindrical plane as the outer peripheral surface of the guide drum, and a plurality of slits formed in the mask member so as to extend in the axial direction of the guide drum and be arranged circumferentially at regular intervals, the circumferential openings of said individual guide drums being situated in different axial positions with respect to the axial direction of the guide drums;
   web transportation means adapted to guide the web so that the web is wound so as to cover part of the mask member on the outer peripheral surface of one of the guide drums, and then to guide the web so that the web is wound so as to cover part of the mask member on the outer peripheral surface of the other guide drum, while causing the guide drums to rotate; and
   laser beam converging means for converging laser beams through the slits of the mask members on the web wound on the respective outer peripheral surfaces of the guide drums, thereby forming very small holes in the web,
   said laser beam converging means including
   a laser beam source for emitting a continuous laser beam parallel to the respective axes of the guide drums toward the region halfway between the guide drums,
   a two-segment mirror disposed between the laser beam source and the guide drums and adapted to reflect the laser beam, emitted from the laser beam source, toward the respective axes of the guide drums so that the laser beam is divided in two,
   split beam guide means for guiding split laser beams, obtained by means of the two-segment mirror, into the guide drums so as to be coaxial therewith,
   multisegment reflection mirrors each fixedly located on the axis of each corresponding guide drum, inside the guide drum, and adapted to reflect the split laser beams toward the web wound on the guide drums so that the split laser beams are radially subdivided into a predetermined number of laser beams,
   condensing lenses arranged at predetermined intervals within the circumference of one and the same circle between the mask member and the multisegment reflection mirror corresponding thereto, and adapted to converge the subdivided laser beams, reflected by the multisegment reflection mirrors, on the web on the guide drums through the slits, and adjusting means for deviating the positions of the condensing lenses in the guide drums from one another in the axial direction of the guide drums.

2. The perforating apparatus according to claim 1, wherein said two-segment mirror is in the form of a triangular prism having a pair of reflecting surfaces adapted to divide and reflect the laser beam emitted from the laser beam source, an edge defined between said reflecting surfaces being directed to the laser beam source and perpendicular to a plane containing the respective axes of the paired guide drums.

3. The perforating apparatus according to claim 2, wherein said split beam guide means includes direction changing mirrors each located on the axis of each corresponding guide drum and adapted individually to reflect the split laser beams, reflected by their corresponding reflecting surfaces of the two-segment mirror, toward the multisegment mirrors in the guide drums.

4. The perforating apparatus according to claim 3, wherein each said multisegment mirror is in the form of a regular polygonal pyramid having edges directed to each corresponding direction changing mirror and situated on the axis of each corresponding guide drum.

5. The perforating apparatus according to claim 4, wherein each said adjusting means includes a holder for holding the condensing lens, guide means for guiding the holder in the axial direction of the guide drum, and feed screw means for moving the holder in the axial direction of the guide drum.

6. The perforating apparatus according to claim 1, further comprising a housing containing the pair of guide drums and a plurality of exhaust ducts connected to the housing.

7. The perforating apparatus according to claim 6, further comprising cooling means for cooling the multisegment mirrors.

8. The perforating apparatus according to claim 7, wherein said cooling means includes a cooling pipe having one end opening situated near each corresponding multisegment mirror so that cooling air is ejected from the one end opening toward the multisegment mirror.

9. The perforating apparatus according to claim 1, wherein each said slit has a width of 0.1 mm and the distance between each two adjacent slits is 1.0 mm.

* * * * *